(12) United States Patent
Hold et al.

(10) Patent No.: US 11,012,802 B2
(45) Date of Patent: May 18, 2021

(54) COMPUTING SYSTEM FOR BINAURAL AMBISONICS DECODING

(71) Applicant: Microsoft Technology Licensing, LLC, Redmond, WA (US)

(72) Inventors: Christoph Felix Hold, Berlin (DE); Hannes Gamper, Seattle, WA (US); Ville Topias Pulkki, Espoo (FI); Nikunj Raghuvanshi, Redmond, WA (US); Ivan Jelev Tashev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 16/459,918

(22) Filed: Jul. 2, 2019

(65) Prior Publication Data
US 2021/0006923 A1    Jan. 7, 2021

(51) Int. Cl.
G10L 19/008 (2013.01)
G10L 19/16 (2013.01)
H04S 7/00 (2006.01)
H04R 5/04 (2006.01)
H04R 5/02 (2006.01)
H04S 3/00 (2006.01)
A63F 13/25 (2014.01)

(52) U.S. Cl.
CPC .............. H04S 7/303 (2013.01); A63F 13/25 (2014.09); H04R 5/02 (2013.01); H04R 5/04 (2013.01); H04S 3/008 (2013.01); A63F 2300/30 (2013.01); H04S 2400/01 (2013.01); H04S 2420/01 (2013.01); H04S 2420/11 (2013.01)

(58) Field of Classification Search
CPC ...... H04S 3/008; H04S 7/303; H04S 2400/01; H04S 2420/01; G10L 19/008; G10L 19/167

USPC .................... 381/303, 17, 310, 306; 704/500
See application file for complete search history.

(56) References Cited

U.S. PATENT DOCUMENTS

2014/0358557 A1* 12/2014 Sen ................... G10L 19/008
                                                               704/500
2015/0156599 A1*  6/2015 Romigh ................ H04S 5/005
                                                                 381/17

OTHER PUBLICATIONS

Avni, et al., "Spatial Perception of Sound Fields Recorded by Spherical Microphone Arrays with Varying Spatial Resolution", In Journal of the Acoustical Society of America, vol. 133, Issue 5, May 2013, pp. 2711-2721.

Bernschutz, Benjamin, "A Spherical Far Field HRIR/HRTF Compilation of the Neumann KU100", In Proceedings of the 40th Italian (AIA) annual conference on acoustics and the 39th German annual conference on acoustics (DAGA) conference on acoustics, Mar. 2013, 4 Pages.

(Continued)

*Primary Examiner* — Paul Kim
*Assistant Examiner* — Ubachukwu A Odunukwe
(74) *Attorney, Agent, or Firm* — Medley, Behrens & Lewis, LLC

(57) ABSTRACT

A computing system that facilitates decoding a spherical harmonics (SH) representation of a three-dimensional sound signal to a binaural sound signal is described herein. The computing system generates a binaural sound signal based upon the SH representation, a tapering window function that is selected based on an SH encoding order of the SH representation, and a coloration compensation filter that incorporates the tapering window function. The computing system causes the binaural sound signal to be played over at least two speakers.

20 Claims, 12 Drawing Sheets

(56) References Cited

OTHER PUBLICATIONS

Duraiswami, et al., "High Order Spatial Audio Capture and its Binaural Head-Tracked Playback over Headphones with HRTF Cues", In Proceedings of 119 AES Convention, Oct. 7, 2005, 16 Pages.

Frank, et al., "Producing 3D Audio in Ambisonics", In Proceedings of AES 57th International Conference: The Future of Audio Entertainment Technology—Cinema, Television and the Internet, Mar. 6, 2015, pp. 1-8.

Hold, et al., "Improving Binaural Ambisonics Decoding by Spherical Harmonics Domain Tapering and Coloration Compensation", In Proceedings of IEEE International Conference on Acoustics, Speech and Signal Processing, May 12, 2019, pp. 261-265.

Hur, et al., "Spectral Equalization in Binaural Signals Represented by Order-Truncated Spherical Harmonics", In Journal of the Acoustical Society of America, vol. 141, Issue 6, Jun. 2, 2017, pp. 4087-4096.

May, et al., "A Probabilistic Model for Robust Localization Based on a Binaural Auditory Front-End", In Journal of IEEE Transactions on Audio, Speech and Language Processing, vol. 19, Issue 1, Jan. 2011, pp. 1-13.

Politis, et al., "COMPASS: Coding and Multidirectional Parameterization of Ambisonic Sound Scenes", In the Proceedings of IEEE International Conference on Acoustics,Speech, and Signal Processing, Apr. 16, 2018, 5 Pages.

Politis, et al., "Enhancement of Ambisonic Binaural Reproduction Using Directional Audio Coding with Optimal Adaptive Mixing", In Proceedings of IEEE Workshop on Applications of Signal Processing to Audio and Acoustics, Oct. 15, 2017, 5 Pages.

Politis, Archontis, "Microphone Array Processing for Parametric Spatial Audio Techniques", In Doctoral Dissertations of Aalto University, 2016, Aug. 9, 2016, 126 Pages.

Rafaely, et al., "Interaural cross correlation in a sound field represented by spherical harmonics", In Journal of the Acoustical Society of America, vol. 127, Issue 2, Feb. 2010, pp. 823-828.

Schissler, et al., "Efficient Construction of the Spatial Room Impulse Response", In Proceedings of the IEEE Virtual Reality (VR), Mar. 18, 2017, pp. 122-130.

Veen, et al., "Beamforming: A Versatile Approach to Spatial Filtering", In Journal of IEEE ASSP Magazine, vol. 5, Issue 2, Apr. 1988, pp. 4-24.

Zotter, et al., "All-round Ambisonic Panning and Decoding", In Journal of the Audio Engineering Society, vol. 60, Issue 10, Oct. 2012, pp. 807-820.

Hold, et al. "Improvements on Higher Order Ambisonics Reproduction in the Spherical Harmonics Domain Under Real-time Constraints", Retrieved From: https://www.microsoft.com/en-us/research/video/improvements-on-higher-order-ambisonics-reproduction-in-the-spherical-harmonics-domain-under-real-time-constraints/#!related_info, Aug. 31, 2018, 2 Pages.

\* cited by examiner

COMPUTING SYSTEM FOR BINAURAL AMBISONICS DECODING

BACKGROUND

Spatial sound scenes refer to audio scenes in which sound is reproduced (or appears to be reproduced) by a sound system in three dimensions. A spatial sound scene covers sounds produced by sound sources not only in a horizontal plane of ears of a listener, but also sounds produced by sound sources that are above and below the ears of the listener, as well as surface reflections off the horizontal plane, for example from the floor or ceiling. In comparison to stereo sound scenes and traditional planar-based surround sounds scenes, spatial sound scenes provide a more realistic auditory experience to the listener.

Three-dimensional sound signals representing spatial sound scenes may be encoded in different formats. One format is an object-based representation. In the object-based representation, a description of sound sources in a sound system that is to reproduce the spatial sound scene is required, as well as locations of the sound sources in the sound system with respect to a listener. In the object-based representation, a rendering cost of reproducing the spatial sound scene scales with a number of sound sources in a sound system that reproduces the spatial sound scene.

Another format for encoding three-dimensional sound signals is a spherical harmonics (SH) representation (also referred to as Ambisonics). An SH representation represents a spatial sound scene in terms of SH coefficients. Unlike object-based representations, the SH representation describes a spatial sound scene in a manner that is independent of a number of sound sources present in the scene as well as a sound system that reproduces the spatial sound scene. Thus, a rendering cost of reproducing the SH representation does not scale with a number of sound sources present in the spatial sound scene, but rather scales with an SH encoding order of the SH representation. A defining feature of spatial sound scenes is their spatial bandwidth, which is a measure of the spatial diversity and acuity of sources in the scene. Complex natural or virtual scenes may have high spatial bandwidth. One way to quantify spatial bandwidth is via the number of SH coefficients required to encode the spatial sound scene. Higher SH encoding orders utilize a relatively greater number of SH coefficients, thus leading to a relatively more accurate reproduction of the spatial sound scene with high spatial bandwidth, but higher SH encoding orders require more computational resources and data rates to decode. In contrast, lower SH encoding orders utilize relatively fewer SH coefficients, thus leading to a relatively less accurate reproduction of the spatial sound scene with high spatial bandwidth, but lower SH encoding orders require less computational resources and data rates to decode. By way of example, a number of SH coefficients of a first SH representation of SH encoding order two is greater than a number of SH coefficients of a second SH representation of SH encoding order one, and hence the first SH representation includes relatively less inaccuracies when reproduced over a sound system and the second SH representation includes relatively more inaccuracies when reproduced over a sound system. In practice, higher order SH coefficients are often truncated from the SH representation of a spatial sound scene with high spatial bandwidth in order to account for limited computational resources; however, this negatively affects quality of the spatial sound scene by introducing spatial and spectral inaccuracies.

Spatial sound scenes encoded in an SH representation are often reproduced binaurally over headphones, either by way of simulating an array of virtual speakers or by decoding the SH representation directly to binaural sound signals via SH encoded head-related transfer function (HRTF) filters. HRTF filters have high spatial bandwidth, that is, they require a large number of SH coefficients for accurate SH representation. Binaural audio refers to an audio reproduction that allows a listener to localize sound sources in three dimensions (e.g., sound sources in front of the listener, sound sources behind the listener, sound sources to the left of the listener, sound sources to the right of the listener, sound sources above the listener, sound sources below the listener, etc.).

Converting an SH representation to a binaural sound signal introduces various inaccuracies to the binaural sound signal (e.g., due to truncation of higher order SH coefficients of the spatial sound scene or the HRTF filters). The inaccuracies may include average spectral coloration which affects the timbre of the binaural sound signal. The inaccuracies may also include angle-dependent spectral coloration, which introduces inaccuracies based upon an angle of the binaural sound signal with respect to the listener. The inaccuracies may further include left-right confusion in a reproduction whereby sounds that are meant to be reproduced as coming from the left of the listener are perceived by the listener as coming from the right of the listener (and vice versa). The inaccuracies may also include front-back confusion in a reproduction whereby sounds that are meant to be reproduced as coming from the front of the listener are perceived by the listener as coming from the back of the listener (and vice versa). The inaccuracies may additionally include inconsistent reproduction of moving sounds with respect to the listener.

SUMMARY

The following is a brief summary of subject matter that is described in greater detail herein. This summary is not intended to be limiting as to the scope of the claims.

Disclosed herein are various technologies pertaining to generating a binaural sound signal from a spherical harmonics (SH) representation of a three-dimensional sound signal. More specifically, a computer-executable decoder that generates the binaural sound signal from the SH representation based upon a tapering window function and a coloration compensation filter is described herein.

In operation, a computing system that executes the decoder accesses the SH representation of the three-dimensional sound signal. The SH representation is of an SH encoding order. In an embodiment, the SH representation is stored in a data store as a computer-readable, multi-channel sound file, and as such the computing system accesses the SH representation by retrieving the multi-channel sound file from the data store. In another embodiment, the computing system dynamically generates the SH representation.

The decoder generates a binaural sound signal from the SH representation based upon a tapering window function and a coloration compensation filter that incorporates the tapering window function (i.e., the coloration compensation filter is derived with respect to the tapering window function). The tapering window function is determined by the SH encoding order of the SH representation. The binaural sound signal comprises a first signal and a second signal. Subsequent to generating the binaural sound signal, the decoder causes the first signal to be played over a first speaker and the second signal to be played over a second speaker. For instance, the first speaker and the second speaker may be comprised by headphones worn by a listener, and as such the decoder may cause the first signal to be played over the first speaker and the second signal to be played over the second speaker.

More specifically, in a first embodiment, the decoder applies the tapering window function to the SH representation of the three-dimensional sound signal to generate an intermediate SH representation of the three-dimensional sound signal. The decoder applies head-related transfer function (HRTF) filters to the intermediate SH representation to generate an intermediate binaural sound signal. The decoder applies the coloration compensation filter to the intermediate binaural sound signal to generate the binaural sound signal.

In a second embodiment, the decoder applies HRTF filters to the SH representation to generate the binaural sound signal. In the second embodiment, the HRTF filters incorporate both the tapering window function and the coloration compensation filter. Moreover, the coloration compensation filter itself incorporates the tapering window function (i.e., the coloration compensation filter is derived with respect to the tapering window function).

The above-described technologies present various advantages over conventional technologies for decoding SH representations of three-dimensional sound signals to binaural sound signals. First, as noted above, the computing system (or another computing system) may apply a tapering window function directly to the HRTF filters used for decoding the SH representation to a binaural sound signal. Moreover, the tapering window function may be applied to the HRTF filters offline prior to run-time. Thus, the above-described technologies may incur zero additional computational costs at run-time. Second, compared to conventional technologies, the above-described technologies reduce magnitudes of inaccuracies introduced to binaural sound signals when SH representations of three-dimensional sound signals are converted to the binaural sound signals. More specifically, the above-described technologies reduce coloration introduced by order truncation of SH representations through the use of the tapering window function.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
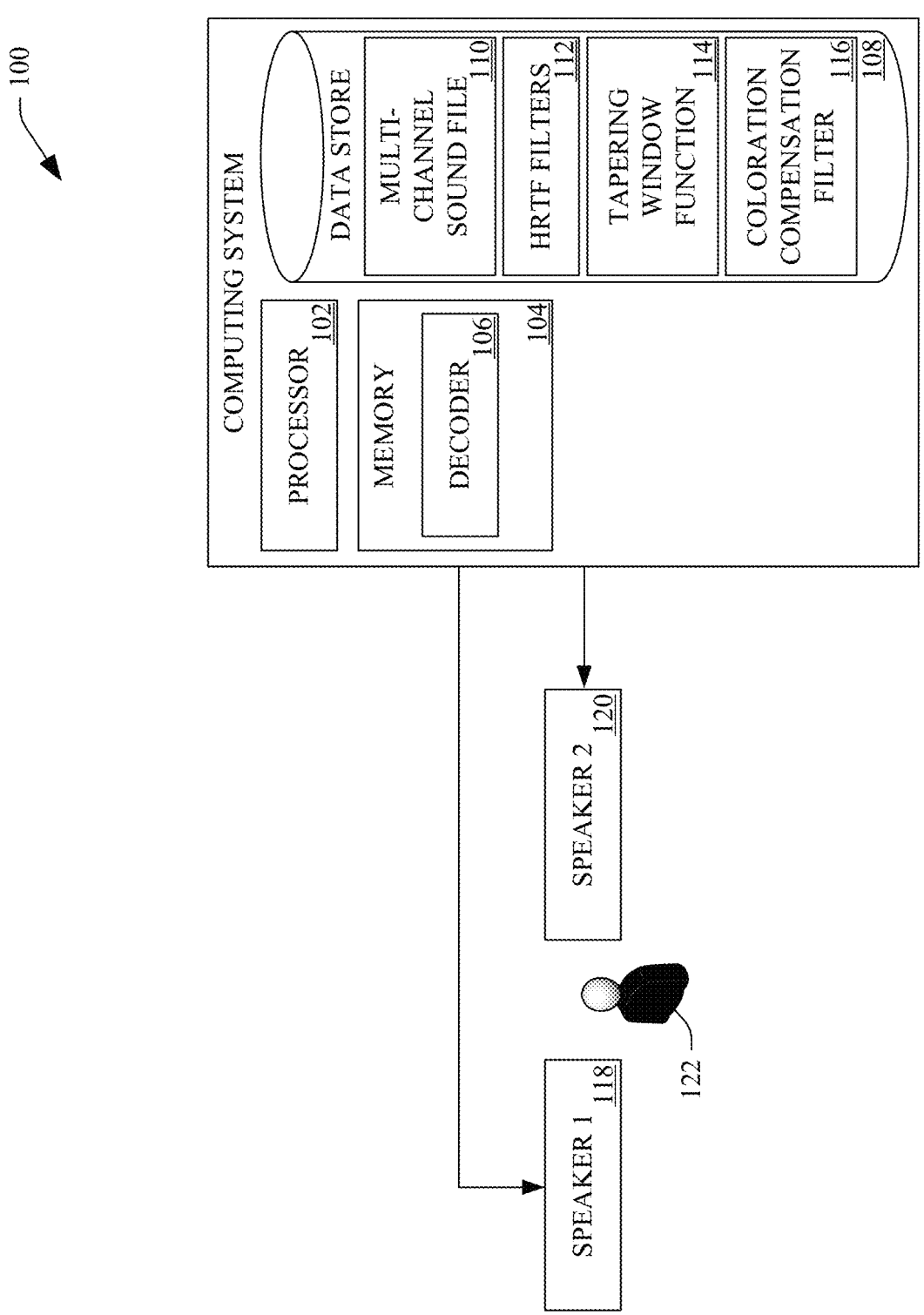
FIG. 1 is a functional block diagram of an exemplary computing system that facilitates decoding three-dimensional sound signals to binaural sound signals.

Various technologies pertaining to decoding spherical harmonics (SH) representations of three-dimensional sound signals to binaural sound signals are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference to FIG. 1, an exemplary computing system 100 that facilitates decoding SH representations of three-dimensional sound signals to binaural sound signals is illustrated. In an embodiment, the computing system 100 may be a desktop computing device, a laptop computing device, a tablet computing device, a smartphone, a wearable computing device, a virtual reality computing device, or a video game console. In another embodiment, the computing system 100 may be a server computing device or a cloud-based computing platform.

The computing system 100 includes a processor 102 and memory 104, wherein the memory 104 has a computer-executable decoder 106 loaded therein. As will be described in greater detail below, the decoder 106 (when executed by the processor 104) is generally configured to decode an SH representation of a three-dimensional sound signal to a binaural sound signal. It is to be understood that the decoder 106 may be incorporated into another computer-executable application (not shown) also loaded in the memory 104.

The computing system 100 may further include a data store 108. The data store 108 stores a multi-channel sound file 110 that includes an SH representation (described in greater detail below) of a three-dimensional sound signal.

A description of the SH representation included in the multi-channel sound file 110 is now set forth. More specifically, the multi-channel sound file 110 includes a three-dimensional representation of a sound field. When the multi-channel sound file 110 is read into the memory 104, the three-dimensional representation of the sound field may be referred to as a three-dimensional sound signal. When representing a three-dimensional sound signal in an SH domain, a manner in which a point can be represented on a unit sphere is leveraged. The point on the unit sphere may be defined in terms of azimuth $\varphi$ and colatitude $\theta$. A spherical harmonics transform (SHT) (also referred to as a spherical Fourier Transform) enables a sound field (corresponding to the unit sphere) to be represented in an SH domain. The SHT defined for any sound field $s(\varphi, \theta)=s(\Omega)$ is given by equation (1):

$$\sigma_{nm}=\int_\Omega s(\Omega)[Y_n^m(\Omega)]^* d\Omega \qquad (1)$$

In equation (1), the SH $Y_n^m(\varphi, \theta)=Y_n^m(\Omega)$ form an orthogonal and complete set of spherical basis functions and as such the SH coefficients $\sigma_{nm}$ can be interpreted as the angular spectrum (or space-frequency spectrum) on the unit sphere.

The inverse SHT is given as the Fourier series in equation (2):

$$s(\Omega)=\Sigma_{n=0}^N \Sigma_{m=-n}^{+n} \sigma_{nm} Y_n^m(\Omega). \qquad (2)$$

In equation (2), N (a non-negative integer) is referred to as an SH encoding order of the SH representation, which yields $(N+1)^2$ Ambisonics (i.e., SH) channels. In an example, the SH encoding order may be first order (N=1), second order (N=2), third order (N=3), and so forth. When $N=\infty$, the SH representation is a perfect reconstruction of the sound field.

The real SH basis functions $Y_{n,m}$ for SH encoding order n and degree m may be given by equation (3):

$$Y_{n,m}(\theta, \varphi) = \sqrt{\frac{(2n+1)}{4\pi} \frac{(n-|m|)!}{(n+|m|)!}} P_{n,|m|}(\cos\theta) y_m(\varphi). \qquad (3)$$

In equation (3), $P_{n,|m|}$ is the associated Legendre polynomial and $y_m$ is given by equation (4):

$$y_m(\varphi) = \begin{cases} \sqrt{2}\sin(|m|\varphi) & \text{if } m < 0 \\ 1 & \text{if } m = 0 \\ \sqrt{2}\cos(|m|\varphi) & \text{if } m > 0 \end{cases} \qquad (4)$$

The data store 108 additionally stores head-related transfer function (HRTF) filters 112. In general, the HRTF filters 112 enable conversion of SH representations of three-dimensional sound signals to binaural sound signals. More specifically, the HRTF filters 112 describe a manner in which a sound signal is filtered by diffraction and reflection properties of a head, pinna, and torso of a listener before the sound signal reaches transduction machinery of an eardrum and inner ear of the listener.

A description of the HRTF filters 112 is now set forth. To render a point source binaurally, ear input signals s for the left (l) and right (r) ear are obtained by convolving a source signal x (e.g., in the time domain) with a head-related impulse response (HRIR) in a desired direction, as given in equation (5):

$$s^{l,r}(t)=x(t)*h_{HRIR}^{l,r}(\Omega,t). \qquad (5)$$

In equation (5), (*) represents the time-domain convolution operation.

In a time-frequency domain (assuming far-field propagation and thus plane-wave components $\bar{X}(\Omega)$), the ear input signals are given by equation (6):

$$S^{l,r}(\omega)=\int_\Omega \bar{X}(\Omega,\omega) H_{nm}^{l,r}(\Omega,\omega) d\Omega. \qquad (6)$$

As the real SH basis functions are orthogonal to one another, the ear input signals are also given by equation (7):

$$S^{l,r}(\omega)=\Sigma_{n=0}^N \Sigma_{m=-n}^{+n} \tilde{X}_{nm}(\omega) \tilde{H}_{nm}^{l,r}(\omega) \qquad (7)$$

The time domain binaural sound signals $s^{l,r}(t)$ are obtained from equation (7) via an inverse time domain Fourier Transform.

The data store 108 may further store a tapering window function 114. As will be described in greater detail below, when applied to the SH representation in the multi-channel sound file 110 or when incorporated into the HRTF filters 112, the tapering window function 114 reduces inaccuracies in a binaural sound signal generated from the SH representation. More specifically, the tapering window function 114 reduces the inaccuracies that result from SH encoding order truncation of the SH representation. In a non-limiting example, the tapering window function 114 may be a Hann tapering window function, a Hamming tapering window function, a Blackman tapering window function, a Nuttal tapering window function, a Blackman-Nuttal tapering window function, a Blackman tapering window function, or any other tapering window function. The tapering window function 114 is associated with a plurality of weights. Each weight in the plurality of weights is between 1.0 and 0. A number of weights in the plurality of weights is a function of an SH encoding order of the SH representation and a type of the tapering window function 114 (e.g., Hann tapering window function, Nuttall tapering window function, etc.).

The decoder 106 may apply the tapering window function 114 ($W_N$) to the SH representation shown in equation (2) to yield equation (8):

$$s(\Omega)=\Sigma_{n=0}^N \Sigma_{m=-n}^{+n} w_N(n) \sigma_{nm} Y_n^m(\Omega) \qquad (8)$$

Alternatively, the computing system 100 (or another computing system) may incorporate the tapering window function 114 ($W_N$) into the HRTF filters 112 described by equation (7) to yield equation (9):

$$S^{l,r}(\omega)=\Sigma_{n=0}^N \Sigma_{m=-n}^{+n} w_N(n) \tilde{H}_{nm}^{l,r}(\omega) \qquad (9)$$

The data store 108 may further include a coloration compensation filter 116 that incorporates the tapering window function 114. More specifically, the coloration compensation filter 116 is derived (by the computing system 100 or another computing system) with respect to the tapering window function 114. The coloration compensation filter 116 reduces coloration introduced to a binaural sound signal by the tapering window function 114. In an embodiment, the coloration compensation filter 116 may be incorporated directly into the HRTF filters 112.

A description of the coloration compensation filter 116 (and parameters of a spherical scatter model used to derive the coloration compensation filter 116) is now set forth. Assuming a spherical scatter object of radius $r_0$ in a diffuse sound field, an order dependent frequency response on a rigid sphere can be derived analytically. As the spherical scatter pressure response of a wavenumber is dependent on $k=2\pi f/c$, the tapering window function 114 ($W_N$) can weight each mode n of the rigid sphere as shown in equation (10):

$$p_w(kr_0)|_N = \frac{1}{4\pi}\sqrt{\sum_{n=0}^{N} w_N(n)(2n+1)|b_n(kr_0)|^2} \ . \tag{10}$$

The mode strength on the rigid sphere is given by equation (11):

$$b_n(kr_0) = 4\pi i^n \left[ j_n(kr_0) - \frac{j'_n(kr_0)}{h'_n(kr_0)} h_n(kr_0) \right]. \tag{11}$$

In equation (11), $j_n$ is the spherical Bessel function, $h_n$ is the spherical Hankel function of the second kind, and (') is the derivative with respect to the argument.

When the scatter response above the spatial aliasing limit $N_{full} > kr_0$ is compared to a desired truncated SH encoding order N an extended spectral equalization filter magnitude response is obtained as shown in equation (12):

$$G(kr)|_N = \frac{p(kr_0)|_{N_{full}}}{p_w(kr_0)|_N} \tag{12}$$

In equation (12), the coloration compensation filter equalizes signals of SH encoding order N to the frequency response of a signal at SH encoding order $N_{full} > kr_0$. The coloration compensation filter 116 compensates for spectral coloration introduced by applying the tapering window function 114.

Although the multi-channel sound file 110, the HRTF filters 112, the tapering window function 114, and the coloration compensation filter 116 have been described as being stored in the data store 108, it is to be understood that the multi-channel sound file 110, the HRTF filters 112, the tapering window function 114, and the coloration compensation filter 116 may also be retained in the memory 104. Thus, it is to be understood that the data store 108 is optional in the computing system 100.

The computing system 100 is in communication (e.g., wired or wireless communication) with a first speaker 118 and a second speaker 120. In an example, the first speaker 118 and the second speaker 120 may be comprised by headphones worn by a listener 122 (also referred to as a user), and as such the first speaker 118 may be a left speaker of the headphones and the second speaker 120 may be a right speaker of the headphones. In another example, the first speaker 118 and the second speaker 120 may be comprised by a stereo dipole. Although the first speaker 118 and the second speaker 120 are depicted as being external to the computing system 100 it is to be understood that the first speaker 118 and the second speaker 120 may be integrated into the computing system 100 (e.g., as part of a virtual reality headset). Furthermore, it is to be understood that the computing system 100 may be in communication with more than two speakers.

Operation of the computing system 100 is now set forth. The decoder 106 accesses an SH representation of a three-dimensional sound signal. In an example, the SH representation may be pre-recorded and stored in the data store 108 as the multi-channel sound file 110, and as such the computing system 100 may retrieve the multi-channel sound file 110 from the data store 108 and provide the SH representation in the multi-channel sound file 110 to the decoder 106. In another example, the computing system 100 may dynamically generate the SH representation and provide the SH representation to the decoder 106. For instance, the computing system 100 may generate the SH representation as part of sound included in a video game. In yet another example, the SH representation may be a truncated version of a second SH representation, wherein the SH encoding order of the SH representation is less than a second SH encoding order of the second SH representation. As such, the computing system 100 may generate the (truncated) SH representation from the second SH representation by truncating higher order coefficients from the second SH representation.

The decoder 106 generates a binaural sound signal from the SH representation based upon the tapering window function 114 and the coloration compensation filter 116. The tapering window function 114 is determined (by the computing system 100 or another computing system) by the SH encoding order of the SH representation. As will be described in greater detail below, the decoder 106 may apply the tapering window function 114 to the SH representation directly. Alternatively, the computing system 100 (or another computing system) may incorporate the tapering window function 114 into the HRTF filters 112 offline (e.g., prior to accessing the SH representation). The binaural sound signal comprises a first signal and a second signal, and as such, responsive to generating the binaural sound signal, the decoder 106 causes the first signal to be played over the first speaker 118 and the second signal to be played over the second speaker 120.

With more specificity, in a first embodiment, the decoder 106 generates an intermediate SH representation by applying the tapering window function 114 to the SH representation. The SH representation comprises a plurality of SH coefficients that are based upon the SH encoding order of the SH representation. More specifically, a number of SH coefficients in the SH representation is a function of the SH encoding order of the SH representation. Additionally, the decoder 106 applies the tapering window function 114 to the plurality of SH coefficients by multiplying each SH coefficient in the plurality of SH coefficients with a corresponding weight in the plurality of weights. Each weight in the plurality of weights is defined by the tapering window function 114 and the SH encoding order of the SH representation.

With even more specificity, the plurality of weights may comprise a first group of weights, a second group of weights, and a third group of weights. Each weight in the first group of weights is equal to 1.0. Each weight in the second group of weights is equal to a number that ranges from 1.0 to 0. Moreover, each weight in the second group of weights is monotonically decreasing. Each weight in the third group of weights is equal to 0.

The tapering window 114 may be half-sided (i.e., not symmetric). More specifically, the tapering window 114 may be prepended with ones in order to spare lower orders of the SH representation from tapering. In an example where the tapering window function 114 is a half-sided Hann tapering window function of SH encoding order 3 and the zeroth and first order SH coefficients are excluded from tapering, the weights are 1, 1, 1, and 0.5 (and zero elsewhere). In another example where the tapering window function 114 is a half-sided Hann tapering window function of SH encoding order 4 and the zeroth and first order SH coefficients are excluded from tapering, the weights are 1, 1, 1, 1, and 0.5 (and zero elsewhere). In yet another example where the tapering window function 114 is a half-sided Hann tapering window function of SH encoding order 5 and the zeroth and first order SH coefficients are excluded from tapering, the weights are 1, 1, 1, 1, 0.75, and 0.25 (and zero elsewhere). It is to be understood that different tapering windows of the same SH encoding order may have different weights. For instance, while a Hann tapering window function of SH encoding order 3 and a Nuttal tapering window function of SH encoding order 3 have the same number of weights, the weights of the Hann tapering window function may be different from the weights of the Nuttal tapering window function.

In the first embodiment, the decoder 106 applies the HRTF filters 112 to the intermediate SH representation to generate an intermediate binaural sound signal. The decoder 106 then applies the coloration compensation filter 116 (which incorporates the tapering window function 114) to the intermediate binaural sound signal to generate a binaural sound signal.

In a second embodiment, the computing system 100 (or another computing system) has incorporated both the tapering window function 114 and the coloration compensation filter 116 directly into the HRTF filters 112. As such, in the second embodiment, the decoder 106 applies the HRTF filters 112 to the SH representation to generate a binaural sound signal.

It is to be understood that the SH encoding order of the SH representation may initially be unknown. Thus, in an embodiment, the decoder 106 may determine the SH encoding order of the SH representation. Responsive to determining the SH encoding order, the decoder 106 may select the tapering window function 114 and the coloration compensation filter 116 based upon the SH encoding order.

It is to be understood that applying the tapering window function 114 to the SH representation or incorporating the tapering window function 114 into the HRTF filters 112 may introduce spectral distortions to the binaural sound signal generated by the decoder 106. It is further understood that the binaural sound signal comprises audio at a plurality of frequencies. Thus, the decoder 106 may boost an amplitude of audio at a frequency in a plurality of frequencies comprised by the binaural sound signal in order to account for the spectral distortions, wherein a level of the boosting of the amplitude is based upon the tapering window function 114, the SH encoding order of the SH representation, and the parameters of the spherical scatter model used to derive the coloration compensation filter 116.

The binaural sound signal comprises a first signal and a second signal. The computing system 100 causes the first signal to be played over the first speaker 118 and the second signal to be played over the second speaker 120.

Figure 2:
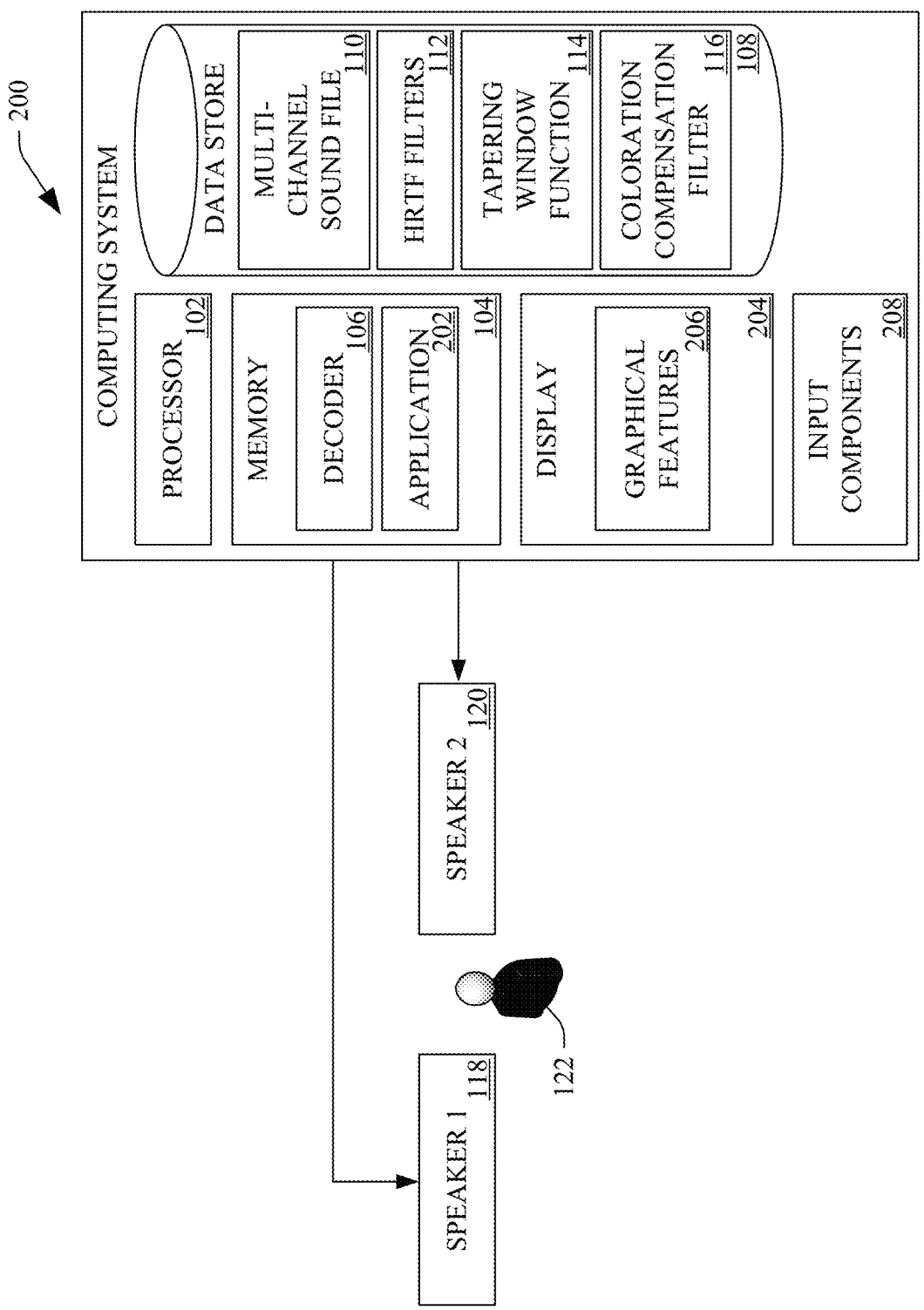
FIG. 2 is a functional block diagram of another exemplary computing system that facilitates decoding three-dimensional sound signals to binaural sound signals.

Referring now to FIG. 2, an exemplary computing system 200 that facilitates decoding SH representations of three-dimensional sound signals to binaural sound signals is illustrated. In an embodiment, the computing system 200 may be a desktop computing device, a laptop computing device, a tablet computing device, a smartphone, a wearable computing device, a virtual reality computing device, or a video game console. The computing system 200 includes the components 102-116 described above in the description of FIG. 1, as well as the first speaker 118 and the second speaker 120. It is to be understood that the computing system 200 may be in communication with more than two speakers.

The computing system 200 includes a computer-executable application 202. The decoder 106 may be incorporated into the application 202. In an example, the application 202 may be a video game application, a movie player application, a virtual reality application, etc.

The computing system 200 further includes a display 204, whereupon graphical features 206 may be presented thereon. The graphical features 206 may include a video stream. In an embodiment, the display 204 may be incorporated into a virtual reality headset worn by the listener 122.

The computing system 200 additionally includes input components 208 that enable a user (e.g., the listener 122) to provide input to the computing system 200. For instance, the input components 208 may include one or more of a mouse, a keyboard, a trackpad, a scroll wheel, a video game controller, a microphone, a camera, a video camera, a touchscreen, etc.

The computing system 200 operates in a manner similar to that of the computing system 100 described above; that is, the decoder 106 generates a binaural sound signal from an SH representation of a three-dimensional sound signal based upon the tapering window function 114 and the coloration compensation filter 116 (either by applying the tapering window function 114 to the SH representation directly or by incorporating the tapering window function 114 into the HRTF filters 112). However, the computing system 200 (by way of the application 202) may cause the graphical features 206 to be presented on the display 204 concurrently with causing the binaural sound signal to be played to the listener 122 over the first speaker 118 and the second speaker 120 (for instance, as part of a video game being played by the listener 122). Additionally, the computing system 200 may receive a context from the listener 122 by way of the input components 208, the context being indicative of a sound that is to be reflected in the SH representation. The computing system 200 may generate the SH representation based upon the context. The computing system 200 may then generate the binaural sound signal from the SH representation as described above in the description of FIG. 1.

Figure 3:
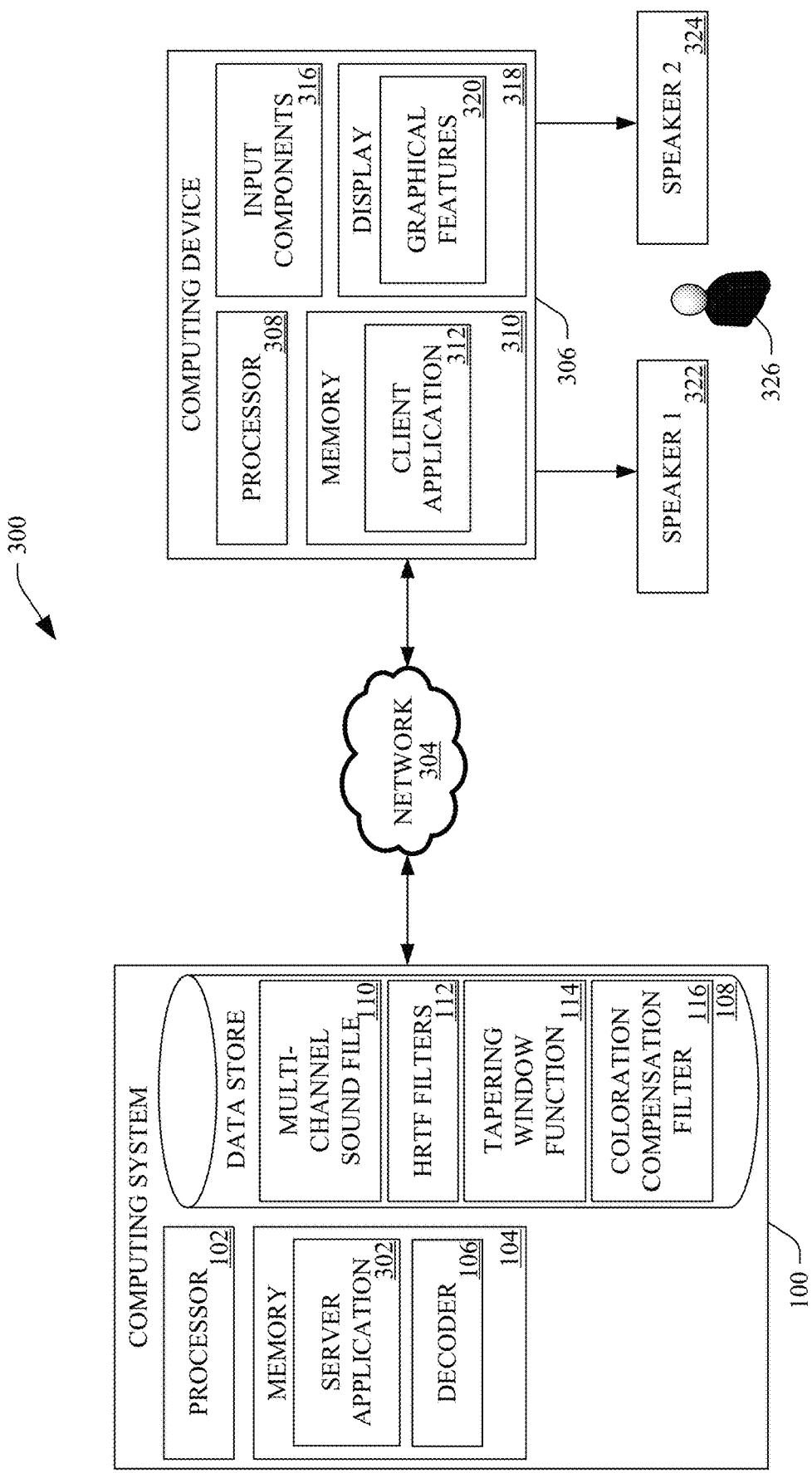
FIG. 3 is a functional block diagram of an exemplary computing environment that facilitates decoding three-dimensional sound signals to binaural sound signals.

Referring now to FIG. 3, an exemplary computing environment 300 that facilitates decoding three-dimensional sound signals to binaural sound signals is illustrated. The computing environment 300 includes the computing system 100, which includes the components 102-116 described above in the description of FIG. 1.

In the computing environment 300, the memory 104 of the computing system 100 further includes a server application 302. In general, the server application 302 (when executed by the processor 102) is configured to communicate with client applications in order to provide audio and/or audio-visual experiences to users (e.g., a listener 326) of the client applications. Although the server application 302 and the decoder 106 are depicted as being separate in the computing environment 300, it is to be understood that the decoder 106 may be incorporated into the server application 302.

The computing environment 300 additionally includes a computing device 306 that is in communication with the computing system 100 by way of a network 304 (e.g., the Internet, intranet, etc.). In an embodiment, the computing device 306 may be a desktop computing device, a laptop computing device, a tablet computing device, a smartphone, a wearable computing device, a virtual reality computing device, or a video game console. The computing device 306 comprises a processor 308 and memory 310, wherein the memory 310 has a client application 312 loaded therein. In general, the client application 312 (when executed by the processor 308) is configured to communicate with the server application 302 in order to provide an audio and/or an audio-visual experience to the listener 326.

The computing device 306 additionally includes input components 316 that enable a user (e.g., the listener 326) of the computing device 306 to provide input to the computing device 306. For instance, the input components 316 may include one or more of a mouse, a keyboard, a trackpad, a scroll wheel, a video game controller, a microphone, a camera, a video camera, a touchscreen, etc.

The computing device 306 further includes a display 318, whereupon graphical features 320 may be presented thereon. The graphical features 320 may include a video stream. In an embodiment, the display 318 may be incorporated into a virtual reality headset worn by the listener 326. The computing device 306 may also include a data store (not shown).

The computing device 306 is in communication (e.g., wired or wireless communication) with a first speaker 322 and a second speaker 324. In an example, the first speaker 322 and the second speaker 324 may be comprised by headphones worn by a listener 326 (also referred to as a user), and as such the first speaker 322 may be a left speaker of the headphones and the second speaker 324 may be a right speaker of the headphones. In another example, the first speaker 322 and the second speaker 324 may be comprised by a stereo dipole. Although the first speaker 322 and the second speaker 324 are depicted as being external to the computing device 306 it is to be understood that the first speaker 324 and the second speaker 326 may be integrated into the computing device 306 (e.g., as part of a virtual reality headset). It is to be understood that the computing device 306 may be in communication with more than two speakers.

The computing system 100 of the computing environment 300 operates in a manner similar to that described above in the description of FIG. 1, that is, the decoder 106 generates a binaural sound signal from an SH representation of a three-dimensional sound signal based upon the tapering window function 114 and the coloration compensation filter 116 (either by applying the tapering window function 114 directly to the SH representation or by having the tapering window function 114 incorporated into the HRTF filters 112). However, in the computing environment 300, the server application 302 causes the binaural sound signal to be transmitted to the computing device 306 over the network 304, whereupon the client application 312 causes the first signal of the binaural sound signal to be played over the first speaker 322 and the second signal of the binaural sound signal to be played over the second speaker 324. The server application 302 may additionally transmit data to the client application 312 that causes the client application 312 to present the graphical features 320 on the display 318 concurrently with causing the binaural sound signal to be played over the first speaker 322 and the second speaker 324 (for instance, as part of a video game). Additionally, the server application 302 may receive a context (e.g., an indication of a sound that is to be reflected in the SH representation) from the client application 312 by way of the network 304. The server application 302 may then generate the SH representation based upon the context.

Although the above-described technologies have been described as decoding an SH representation to a binaural sound signal, it is to be appreciated that the above-described technologies may also be utilized to decode SH representations into other types of sound signals. For instance, the above-described technologies may decode an SH representation to a 5.1 surround sound signal, a 6.1 surround sound signal, a 7.1 surround sound signal, etc.

Figure 4:
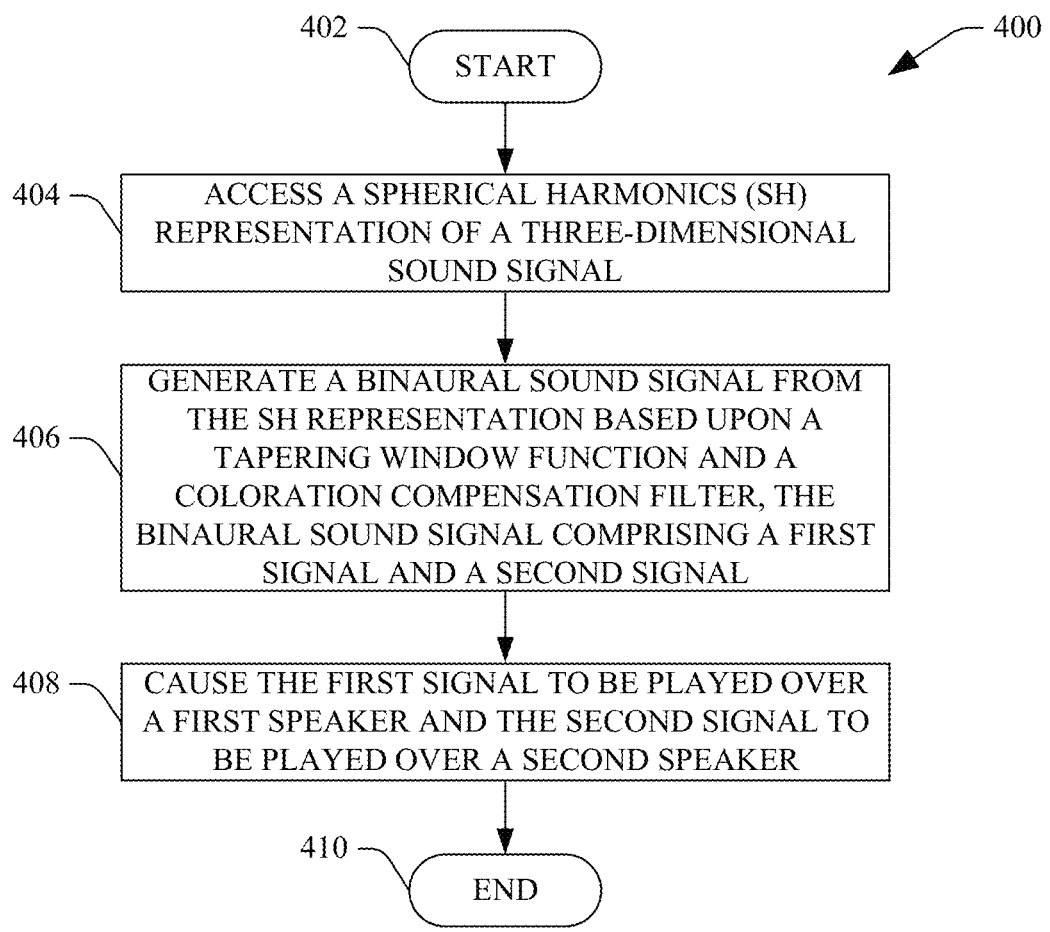
FIG. 4 is a flow diagram that illustrates an exemplary methodology executed by a computing system for decoding three-dimensional sound signals to binaural sound signals.
Figure 5:
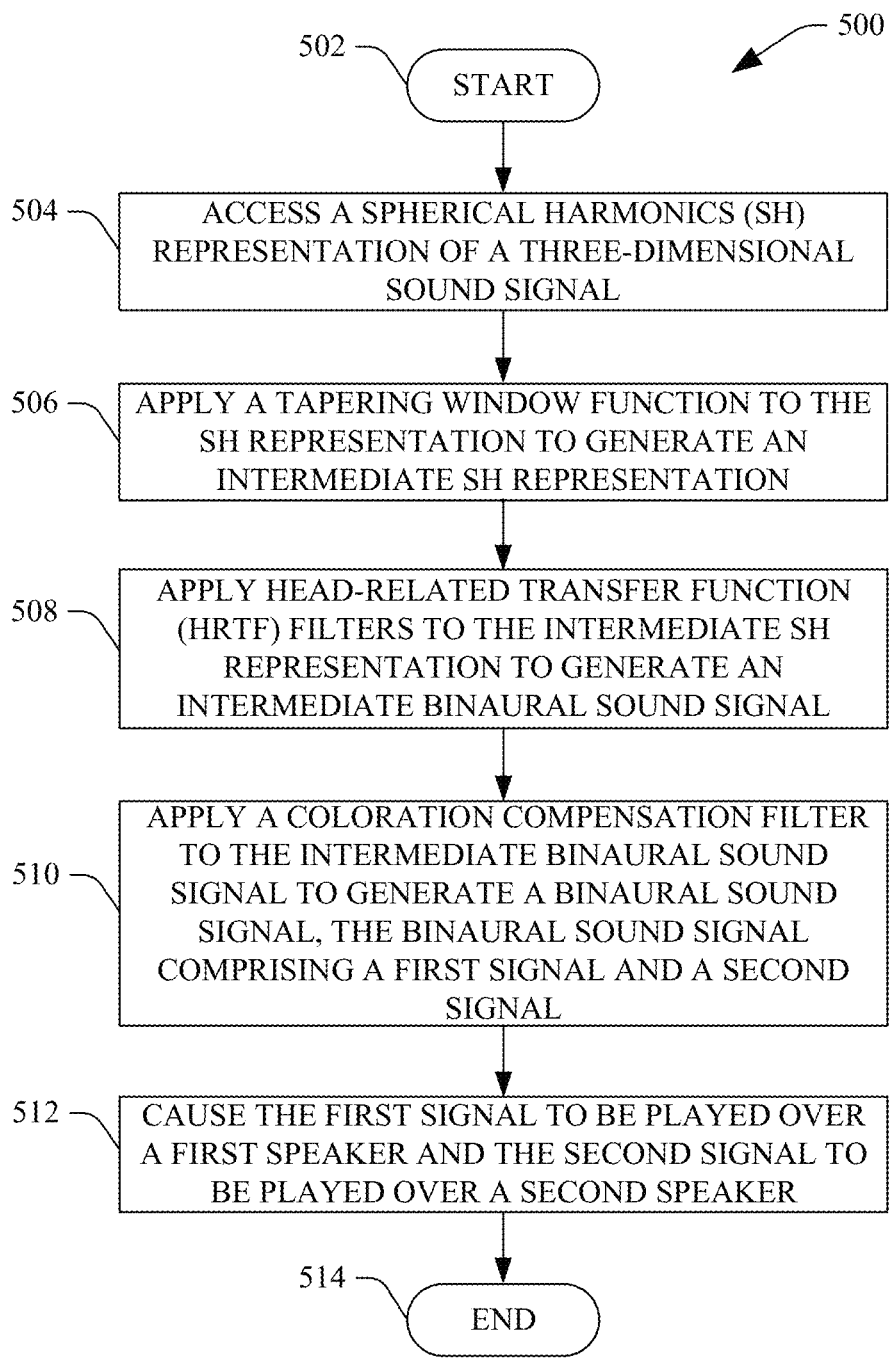
FIG. 5 is a flow diagram that illustrates another exemplary methodology executed by a computing system for decoding three-dimensional sound signals to binaural sound signals.
Figure 6:
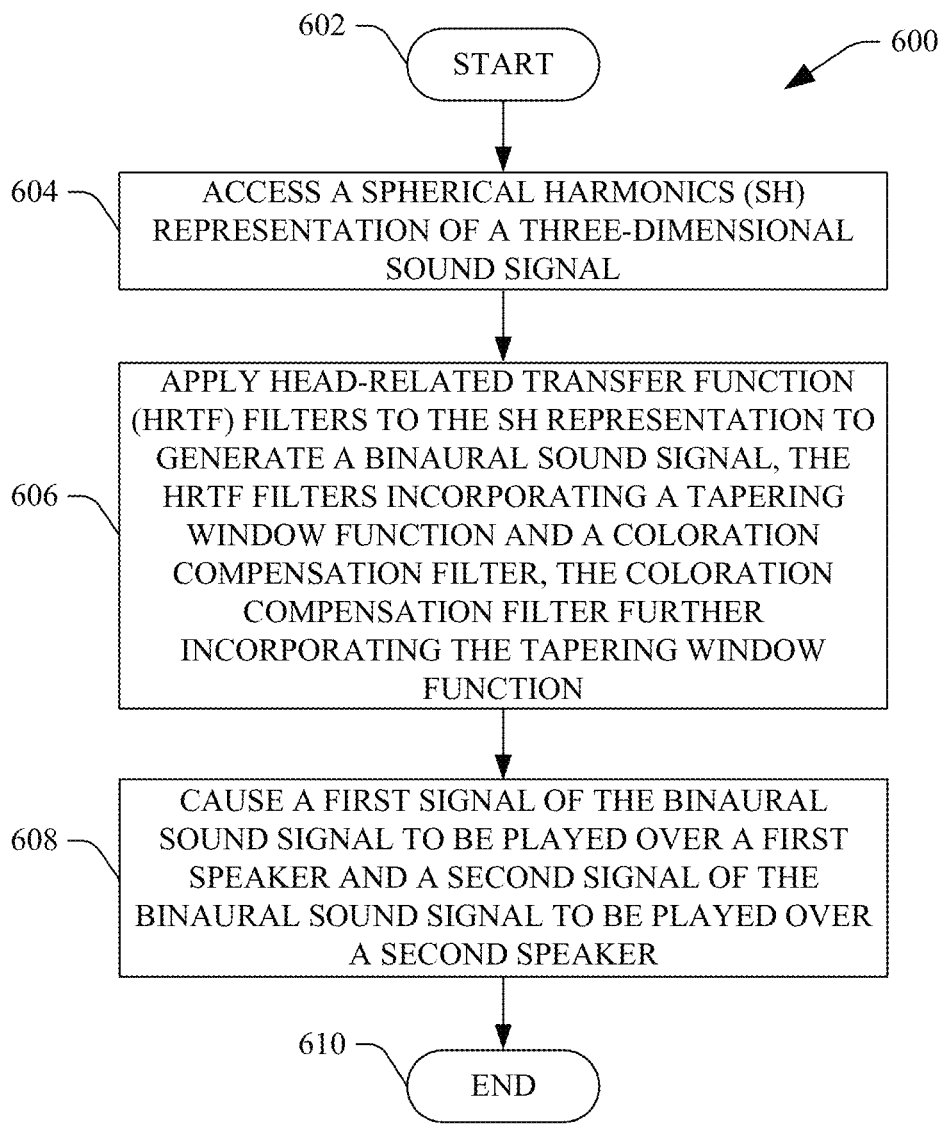
FIG. 6 is a flow diagram that illustrates yet another exemplary methodology executed by a computing system for decoding three-dimensional sound signals to binaural sound signals.

FIGS. 4-6 illustrate exemplary methodologies relating to decoding three-dimensional sound signals to binaural sound signals. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 executed by a computing system that facilitates decoding three-dimensional sound signals to binaural sound signals is illustrated. The methodology 400 begins at 402, and at 404, the computing system accesses an SH representation of a three-dimensional sound signal. The SH representation is of an SH encoding order. At 406, the computing system generates a binaural sound signal from the SH representation based upon a tapering window function and a coloration compensation filter. The tapering window function is determined by the SH encoding order of the SH representation. The coloration compensation filter incorporates the tapering window function (i.e., the coloration compensation filter is derived with respect to the tapering window function). The binaural sound signal comprises a first signal and a second signal. At 408, the computing system causes the first signal to be played over a first speaker and the second signal to be played over a second speaker. The methodology 400 concludes at 410.

Referring now to FIG. 5, a methodology 500 executed by a computing system that facilitates decoding three-dimensional sound signals to binaural sound signals is illustrated. The methodology 500 begins at 502, and at 504, the computing system accesses an SH representation of a three-dimensional sound signal. The SH representation is of an SH encoding order. At 506, the computing system applies a tapering window function to the SH representation to generate an intermediate SH representation. The tapering window function is determined by the SH encoding order of the SH representation. At 508, the computing system applies HRTF filters to the intermediate SH representation to generate an intermediate binaural sound signal. At 510, the computing system applies a coloration compensation filter to the intermediate binaural sound signal to generate a binaural sound signal. The coloration compensation filter incorporates the tapering window function (i.e., the coloration compensation filter is derived with respect to the tapering window function). Furthermore, the binaural sound signal comprises a first signal and a second signal. At 512, the computing system causes the first signal to be played over a first speaker and the second signal to be played over a second speaker. The methodology 500 concludes at 514.

Turning now to FIG. 6, a methodology 600 executed by a computing system that facilitates decoding three-dimensional sound signals to binaural sound signals is illustrated. The methodology 600 begins at 602, and at 604, the computing system accesses an SH representation of a three-dimensional sound signal. The SH representation is of an SH encoding order. At 606, the computing system applies HRTF filters to the SH representation to generate a binaural sound signal. The HRTF filters incorporate a tapering window function. The tapering window function is determined by the SH encoding order of the SH representation. The HRTF filters additionally incorporate a coloration compensation filter. The coloration compensation filter incorporates the tapering window function (i.e., the coloration compensation filter is derived with respect to the tapering window function). The binaural sound signal comprises a first signal and a second signal. At 608, the computing system causes the first signal to be played over a first speaker and the second signal to be played over a second speaker. The methodology 600 concludes at 610.

EXAMPLES

The above-described technologies were evaluated experimentally using a set of spherical anechoic far-field measurements of a Neumann KU100 dummy-head. The measurements were taken on an equidistant spherical Lebedev grid with 2354 nodes to enable a stable transform into the SH domain with low spatial aliasing over an entire audio frequency range. The SH transform of the HRTF filters was carried out by a least mean square fit with Tikhonov regularization directly to an SH encoding order of the SH representation. The coloration compensation filter was generated using a time sampling frequency $f_s$=48 kHz, which lead to $N_{full}$=39 and a scatter radius $r_0$=0.0875 m.

Coloration Error (CE) between references HRIRs (time-domain) and reconstructed HRIRs (after order-truncation in the SH-domain) was modeled according to equation (13):

$$CE = w_l \Delta L_l + w_r \Delta L_r. \quad (13)$$

In equation (13), $w_l$ and $w_r$ are binaural weighting factors. The domain level differences $\Delta L_l$ and $\Delta L_r$ per auditory filter band 50 Hz to 20 kHz for each ear was calculated according to a localization model that includes rectification, compression, and an auditory filter bank. The binaural weighting factors are given by equation (14):

$$w_l = \frac{2^{\Delta L_{lr}/10}}{1 + 2^{\Delta L_{lr}/10}}, \quad w_r = 1 - w_l. \quad (14)$$

In equation (14), the binaural weighting factors $w_l$ and $w_r$ account for coloration errors that are perceptually more relevant for the ear receiving a louder signal.

CE was estimated from a 20 ms white noise burst convolved with third order reconstructed HRIR for 1024 directions distributed uniformly on a sphere. The error between a reference time-domain HRTF and a third order SH representation is detailed in Table 1 (Full Band) and Table 2 (above 2.5 kHz). Negligible error was observed below 2.5 kHz.

TABLE 1

| | RMSE (dB) | max(CE(Ω)) (dB) | max(CE(Ω, f)) (dB) |
|---|---|---|---|
| no tapering, no compensation | 2.0234 | 4.0425 | 20.8375 |
| no tapering, with compensation | 1.7614 | 4.8412 | 22.6504 |
| Hann tapering, with compensation | 1.7199 | 3.1641 | 13.4945 |

TABLE 2

| | RMSE (dB) | max(CE(Ω)) (dB) | max(CE(Ω, f)) (dB) |
|---|---|---|---|
| no tapering, no compensation | 6.3004 | 13.1143 | 20.8375 |
| no tapering, with compensation | 3.8908 | 14.9174 | 22.6504 |
| Hann tapering, with compensation | 3.3664 | 8.7494 | 13.4945 |

In Table 1 and Table 2, RMSE shows root-mean-squared error over frequency and angle, max(CE(Ω)) shows maximum frequency-averaged CE, and max max(CE(Ω, f)) shows maximum coloration error at any filter band frequency and angle. As shown in Table 1 and Table 2, applying a Hann tapering window function along with a coloration compensation filter reduces CE in terms of (RMSE).

Figure 7:
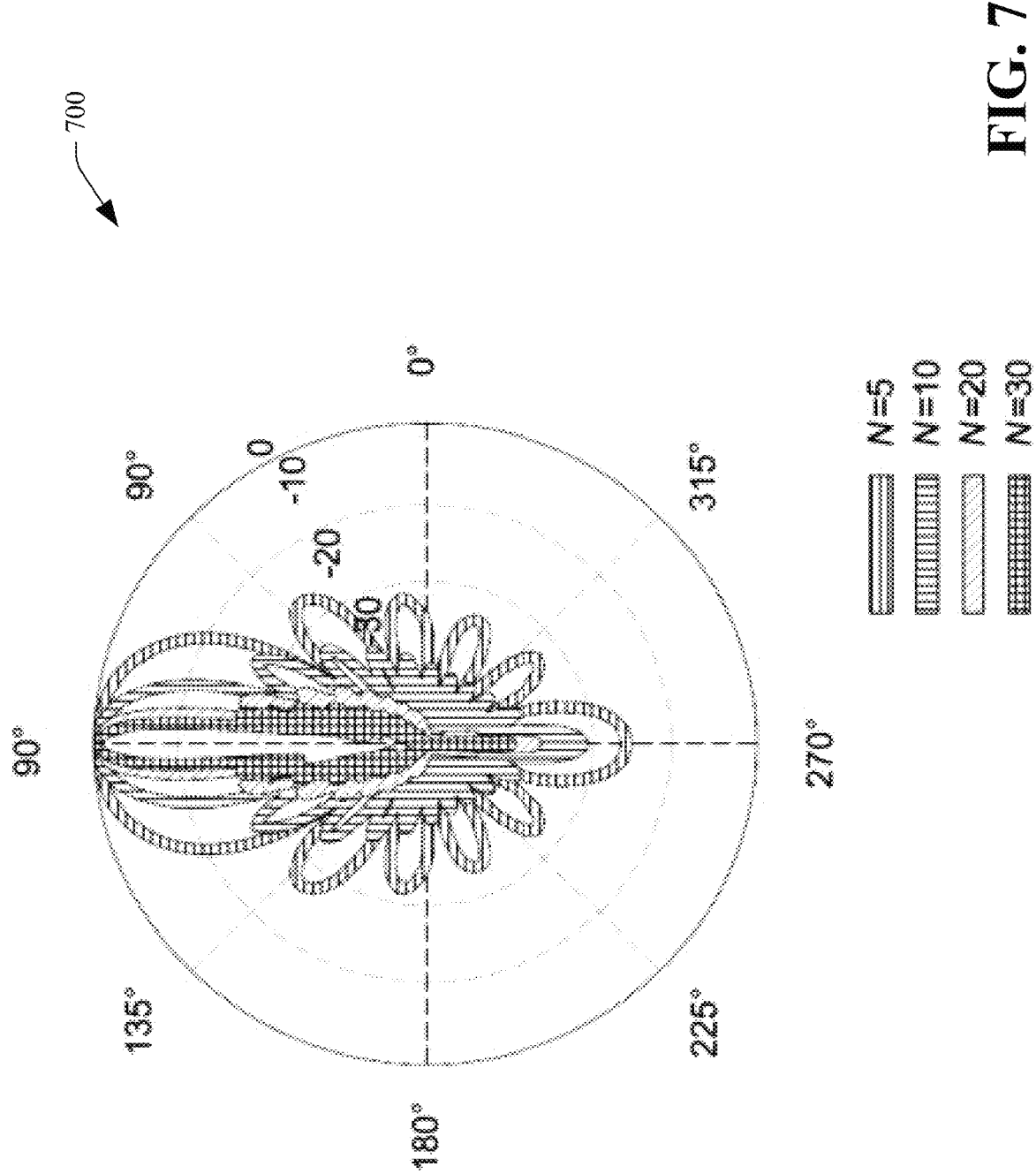
FIG. 7 is a graph that depicts a spatial Dirac pulse magnitude for increasing spherical harmonics representation orders.

Referring now to FIG. 7, a graph 700 corresponding to the example setup noted above that depicts a spatial Dirac pulse magnitude for increasing SH encoding orders is illustrated. More specifically, the graph 700 is a cross section (θ=90°) of a spatial direct pulse magnitude in dB, at Ω=[90°, 90°], reconstructed from the SH representation by equation (2) for an increasing SH encoding order N. As seen in FIG. 7, lower SH encoding orders (e.g., N=5) cause a non-ideal reconstruction, as evidenced by wide sidelobes in the graph 700.

Figure 8:
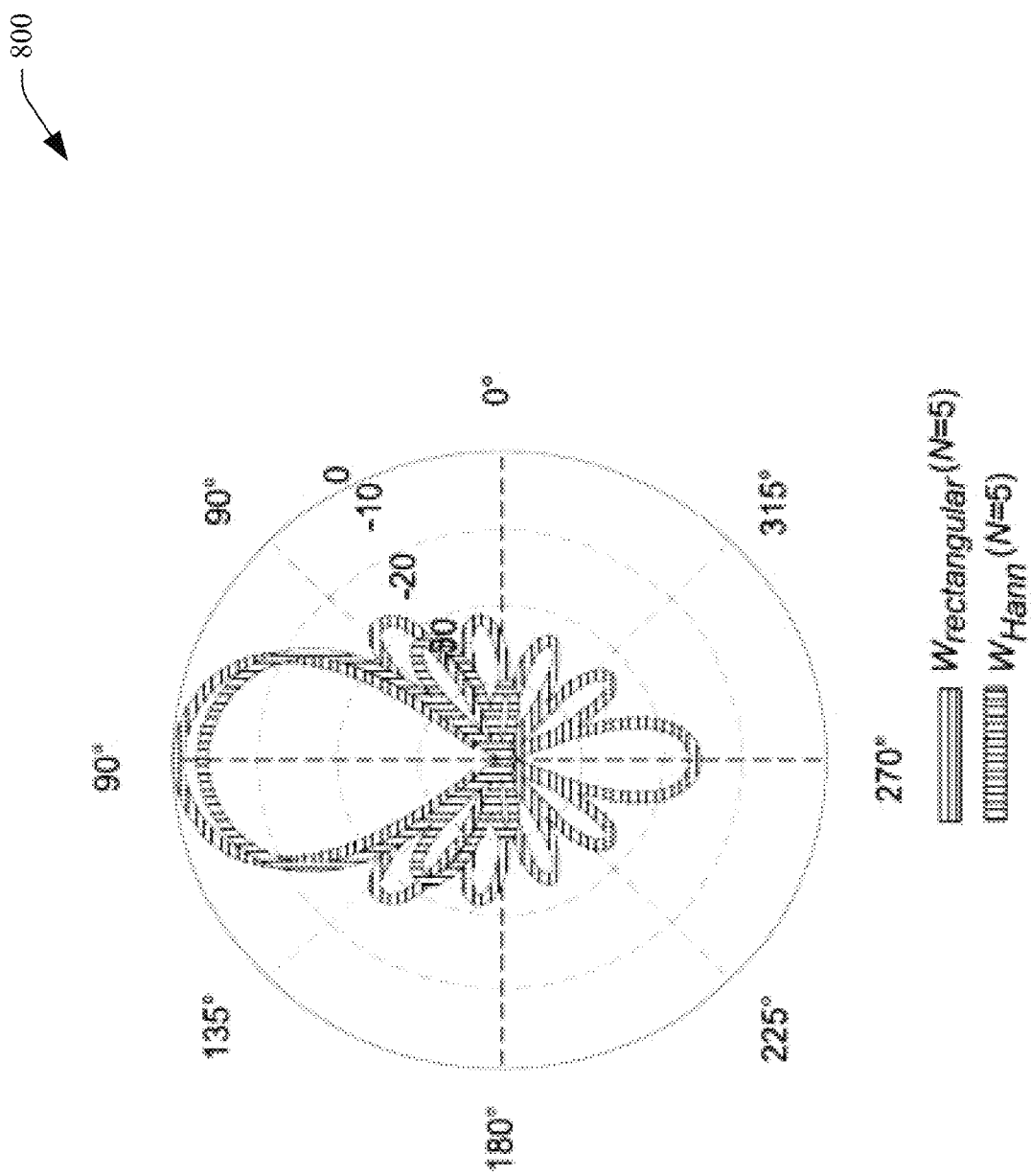
FIG. 8 is a graph that depicts a spatial Dirac pulse magnitude with differing tapering window functions.

With reference now to FIG. 8, a graph 800 corresponding to the example setup noted above that depicts a spatial Dirac pulse magnitude with differing tapering window functions is illustrated. More specifically, the graph 800 is a cross section of a spatial direct pulse magnitude in dB with SH encoding order N=5 at Ω=[90°, 90°] with a rectangular tapering window function and a Hann tapering window function of SH coefficients as given by equation (8). As seen in FIG. 8, the Hann tapering window function improves backlobe suppression to more than 40 dB. However, the Hann tapering window function also causes a slightly smaller and widened main lobe.

Figure 9:
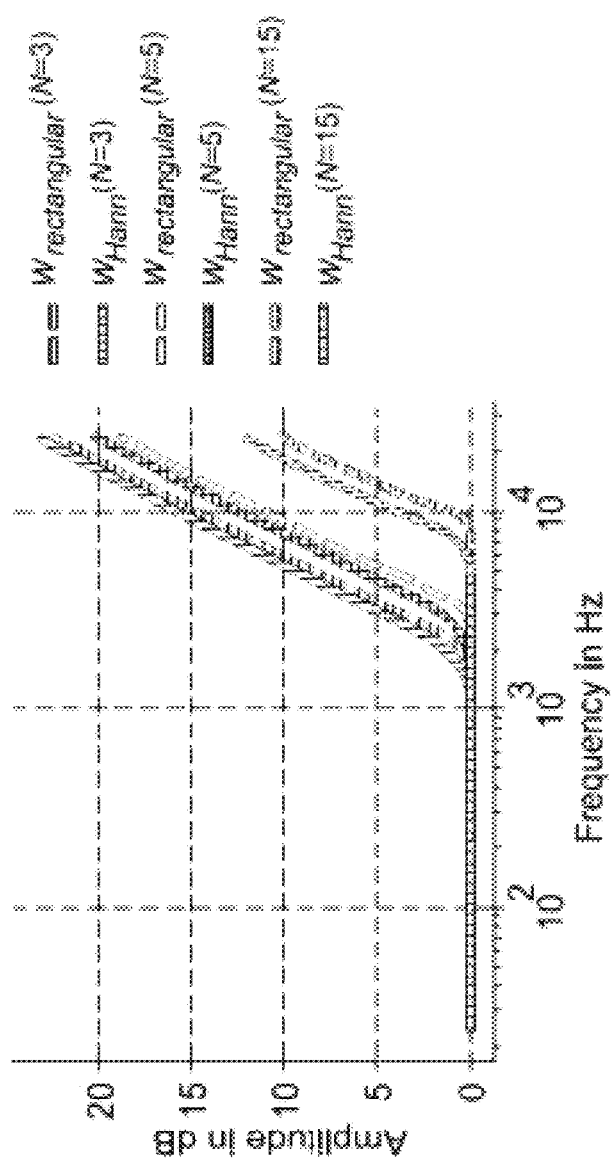
FIG. 9 is a graph that depicts a frequency response of a coloration compensation filter.

Referring now to FIG. 9, a graph 900 corresponding to the example setup noted above that depicts a frequency response of a coloration compensation filter at different SH encoding orders is illustrated. As shown in FIG. 9, a Hann tapering window function requires marginally higher frequency boosting compared to a rectangular tapering window function.

Figure 10:
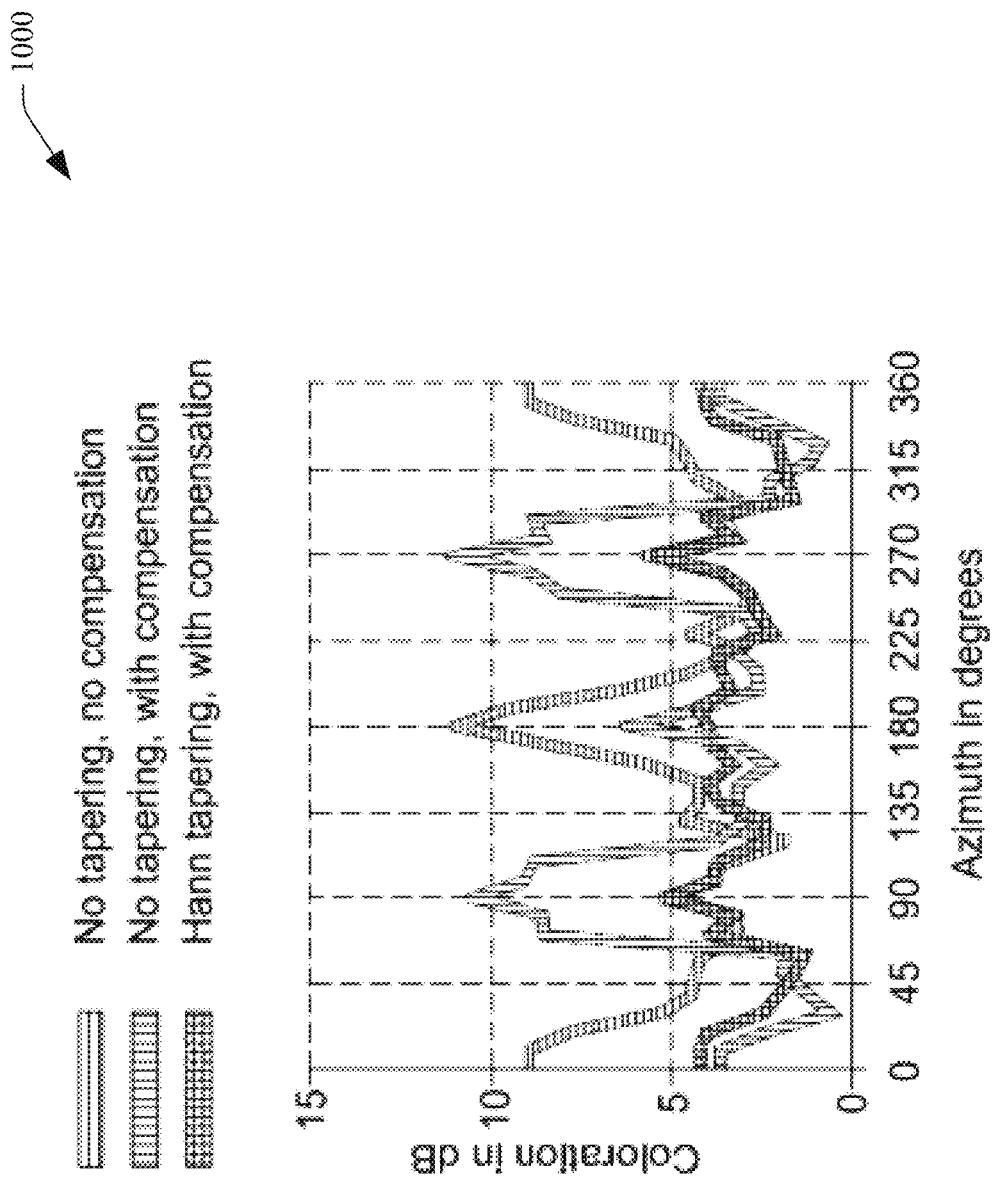
FIG. 10 is a graph that depicts coloration estimation for a point source moving in a horizontal plane.

Turning to FIG. 10, a graph 1000 (corresponding to the example setup noted above) that depicts coloration estimation for a point source moving in a horizontal plane is illustrated. More specifically, the graph 1000 depicts coloration estimation for a truncated third order SH representation (i.e., third order SH encoding order) with a rectangular tapering window function without coloration compensation, a rectangular tapering window function with coloration compensation, and a Hann tapering window function with coloration compensation. As shown in FIG. 10, applying the Hann tapering window function along with coloration compensation reduces variance of the coloration estimation and more evenly distributes the coloration estimation across different directions.

Figure 11:
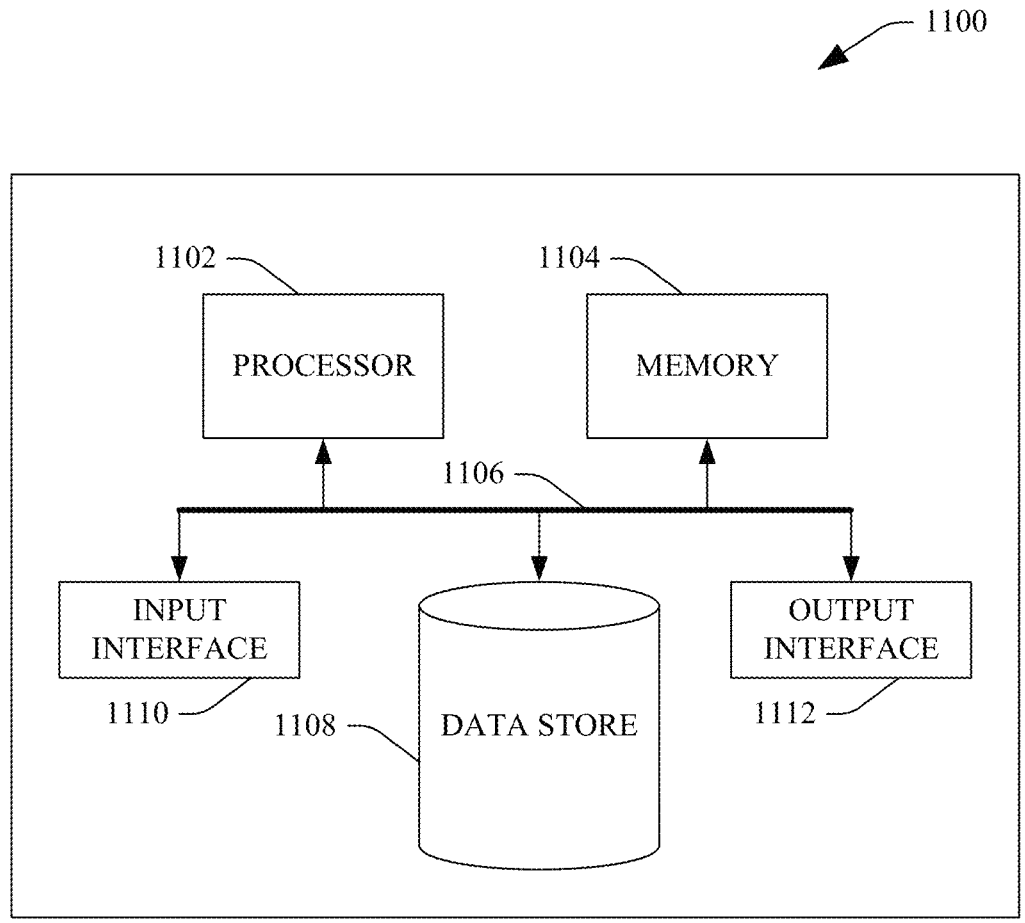
FIG. 11 is an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that decodes three-dimensional sound signals to binaural sound signals. By way of another example, the computing device 1100 can be used in a system that plays a binaural sound signal over speakers. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store multi-channel sound files, HRTF filters, tapering window functions, coloration compensation filters, etc.

The computing device 1100 additionally includes a data store 1108 that is accessible by the processor 1102 by way of the system bus 1106. The data store 1108 may include executable instructions, multi-channel sound files, HRTF filters, tapering window functions, coloration compensation filters, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Figure 12:
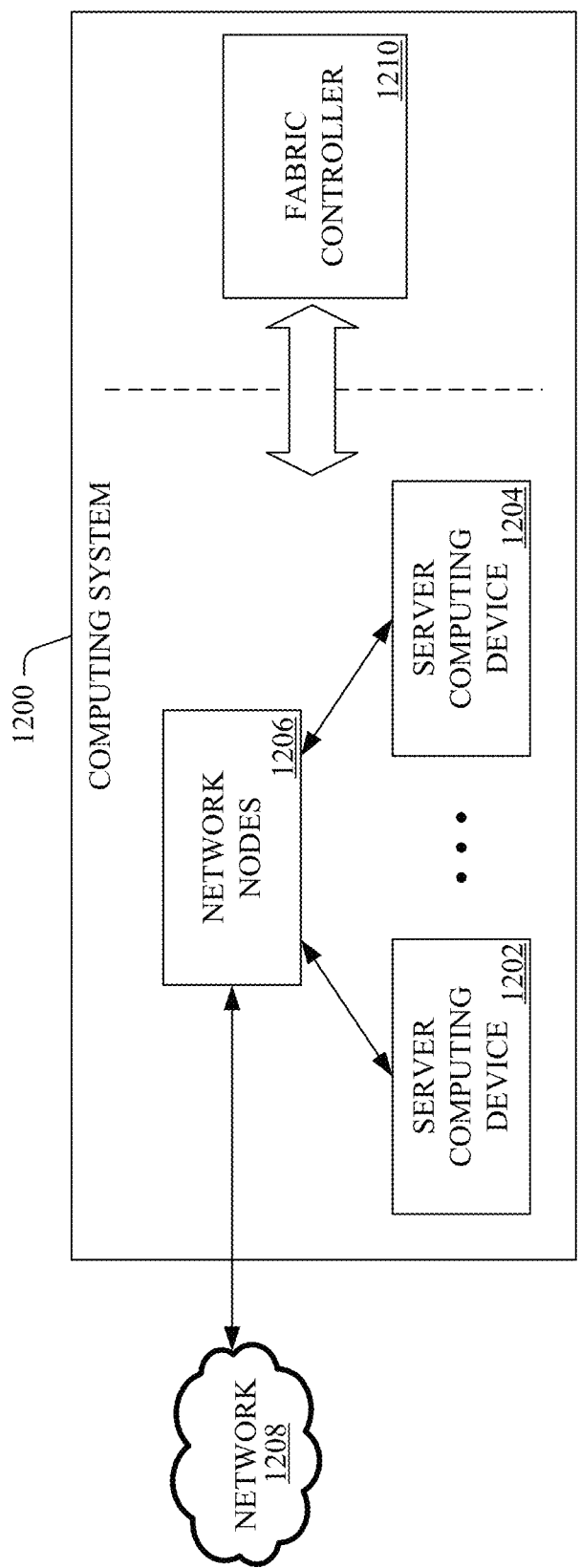
FIG. 12 is an exemplary computing system.

Turning now to FIG. 12, a high-level illustration of an exemplary computing system 1200 that can be used in accordance with the systems and methodologies disclosed herein is illustrated. For instance, the computing system 1200 can be or include the computing system 100 or the computing system 200. Additionally or alternatively, the computing system 100 or the computing system 200 can be or include the computing system 1200.

The computing system 1200 includes a plurality of server computing devices namely, a server computing device 1202, . . . , and a server computing device 1204 (collectively referred to as server computing devices 1202-1204). The server computing device 1202 includes at least one processor and a memory, the at least one processor executes instructions that are stored in the memory. The instructions may be, for instance, instructions for implementing functionality described as being carried out by one or more components discussed above or instructions for implementing one or more of the methods described above. Similar to the server computing device 1202, at least a subset of the server computing devices 1202-1204 other than the server computing device 1202 each respectively include at least one processor and a memory. Moreover, at least a subset of the server computing devices 1202-1204 include respective data stores.

Processors of one or more of the server computing devices 1202-1204 can be or include the processor 102. Further, a memory (or memories) of one or more of the server computing devices 1202-1204 can be or include the memory 104. Moreover, a data store (or data stores) of one or more of the server computing devices 1202-1204 can be or include the data store 108.

The computing system 1200 further includes various network nodes 1206 that transport data between the server computing devices 1202-1204. Moreover, the network nodes 1206 transport data from the server computing devices 1202-1204 to external nodes (e.g., external to the computing system 1200) by way of a network 1208. The network nodes 1206 also transport data to the server computing devices 1202-1204 from the external nodes by way of the network 1208. The network 1208, for example, can be the Internet, a cellular network, or the like. The network nodes 1206 include switches, routers, load balancers, and so forth.

A fabric controller 1210 of the computing system 1200 manages hardware resources of the server computing devices 1202-1204 (e.g., processors, memories, data stores, etc. of the server computing devices 1202-1204). The fabric controller 1210 further manages the network nodes 1206. Moreover, the fabric controller 1210 manages creation, provisioning, de-provisioning, and supervising of virtual machines instantiated upon the server computing devices 1202-1204.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
a processor; and
memory storing instructions that, when executed by the processor, cause the processor to perform acts comprising:
 accessing a spherical harmonics (SH) representation of a three-dimensional sound signal, wherein the SH representation is of an SH encoding order;
 generating a binaural sound signal from the SH representation based upon:
  a tapering window function that is determined by the SH encoding order of the SH representation; and
  a coloration compensation filter, wherein the coloration compensation filter incorporates the tapering window function,
 wherein the tapering window function comprises a plurality of weights, wherein each weight is multiplied with a corresponding SH coefficient in the SH representation as part of generating the binaural sound signal, wherein the binaural sound signal comprises a first signal and a second signal; and
 causing the first signal of the binaural sound signal to be played over a first speaker and the second signal of the binaural sound signal to be played over a second speaker.

2. The computing system of claim 1, wherein the tapering window function is one of:
 a Hann tapering window function;
 a Hamming tapering window function;
 a Blackman tapering window function;
 a Nuttal tapering window function;
 a Blackman-Nuttal tapering window function; or
 a Blackman-Harris tapering window function.

3. The computing system of claim 1, wherein generating the binaural sound signal comprises:
 applying the tapering window function to the SH representation to generate an intermediate SH representation of the three-dimensional sound signal;
 applying head-related transfer function (HRTF) filters to the intermediate SH representation to generate an intermediate binaural sound signal; and
 applying the coloration compensation filter to the intermediate binaural sound signal to generate the binaural sound signal.

4. The computing system of claim 1, wherein the plurality of weights are based upon the tapering window function.

5. The computing system of claim 1, wherein the binaural sound signal comprises audio at a plurality of frequencies, the acts further comprising:
 prior to causing the first signal of the binaural sound signal to be played over the first speaker and the second signal of the binaural sound signal to be played over the second speaker, boosting an amplitude of audio at a frequency in the plurality of frequencies, wherein a level of the boosting of the amplitude is based upon the tapering window function, the SH encoding order of the SH representation, and parameters of a spherical scatter model used to derive the coloration compensation filter.

6. The computing system of claim 1, wherein generating the binaural sound signal comprises:
 applying head-related transfer function (HRTF) filters to the SH representation of the three-dimensional sound signal, wherein the HRTF filters incorporate the tapering window function, and further wherein the HRTF filters incorporate the coloration compensation filter, wherein the binaural signal is generated responsive to applying the HRTF filters.

7. The computing system of claim 1, the acts further comprising:
 prior to accessing the SH representation of the three-dimensional sound signal, generating the SH representation of the three-dimensional sound signal.

8. The computing system of claim 1, the acts further comprising:
 subsequent to accessing the SH representation of the three-dimensional sound signal and prior to generating the binaural sound signal, determining the SH encoding order of the SH representation;
 responsive to determining the SH encoding order, selecting the tapering window function and the coloration compensation filter based upon the SH encoding order.

9. The computing system of claim 1, wherein the SH encoding order of the SH representation is third order.

10. The computing system of claim 1, wherein the computing system is a video game console.

11. The computing system of claim 1, wherein the first speaker and the second speaker are comprised by headphones worn by a listener.

12. A method executed by a processor of a computing system, the method comprising:
 accessing a spherical harmonics (SH) representation of a three-dimensional sound signal, wherein the SH representation is of an SH encoding order;

applying a tapering window function to the SH representation of the three-dimensional sound signal to generate an intermediate SH representation of the three-dimensional sound signal, the tapering window function being determined by the SH encoding order of the SH representation;

applying head-related transfer function (HRTF) filters to the intermediate SH representation to generate an intermediate binaural sound signal;

applying a coloration compensation to the intermediate binaural sound signal to generate a binaural sound signal, wherein the coloration compensation filter incorporates the tapering window function, and further wherein the binaural sound signal comprises a first signal and a second signal; and causing the first signal of the binaural sound signal to be played over a first speaker and the second signal of the binaural sound signal to be played over a second speaker.

13. The method of claim 12, wherein the SH representation comprises a plurality of SH coefficients that are based upon the SH encoding order of the SH representation, wherein applying the tapering window function to the SH representation comprises multiplying each SH coefficient in the plurality of SH coefficients by a corresponding weight in a plurality of weights, the plurality of weights being based upon the tapering window function.

14. The method of claim 12, wherein causing the first signal of the binaural sound signal to be played over the first speaker and the second signal of the binaural sound signal to be played over the second speaker comprises transmitting the binaural sound signal to a computing device that is in network communication with the computing system, wherein the computing device plays the first signal of the binaural sound signal over the first speaker and the second signal of the binaural sound signal over the second speaker.

15. The method of claim 12, wherein the binaural sound signal comprises audio at a plurality of frequencies, the method further comprising:

prior to causing the first signal of the binaural sound signal to be played over the first speaker and the second signal of the binaural sound signal to be played over the second speaker, boosting an amplitude of audio at a frequency in the plurality of frequencies, wherein a level of the boosting of the amplitude is based upon the tapering window function, the SH encoding order of the SH representation, and parameters of a spherical scatter model used to derive the coloration compensation filter.

16. The method of claim 12, wherein the SH encoding order of the SH representation is less than a second SH encoding order of a second SH representation of the three-dimensional sound signal, wherein the SH representation is a truncated version of the second SH representation.

17. The method of claim 12, wherein the first speaker and the second speaker are comprised by a stereo dipole.

18. A computer-readable storage medium comprising instructions that, when executed by a processor of a computing system, cause the processor to perform acts comprising:

accessing a spherical harmonics (SH) representation of a three-dimensional sound signal, wherein the SH representation is of an SH encoding order;

applying head-related transfer function (HRTF) filters to the SH representation of the three-dimensional sound signal to generate a binaural sound signal, wherein the HRTF filters incorporate a tapering window function, wherein the tapering window function is determined by the SH encoding order of the SH representation, wherein the HRTF filters further incorporate a coloration compensation filter, the coloration compensation filter additionally incorporating the tapering window function, wherein the tapering window function comprises a plurality of weights, wherein each weight is multiplied with a corresponding SH coefficient in the SH representation as part of generating the binaural sound signal, and further wherein the binaural sound signal comprises a first signal and a second signal; and causing the first signal of the binaural sound signal to be played over a first speaker and the second signal of the binaural sound signal to be played over a second speaker.

19. The computer-readable storage medium of claim 18, wherein the computing system causes graphical data to be presented on a display concurrently with causing the first signal of the binaural sound signal to be played over the first speaker and the second signal of the binaural sound signal to be played over the second speaker.

20. The computer-readable storage medium of claim 18, the acts further comprising:

prior to accessing the SH representation of the three-dimensional sound signal, receiving a context, wherein the context is indicative of a sound that is to be reflected in the SH representation; and generating the SH representation of the three-dimensional sound signal based upon the context.

\* \* \* \* \*